July 30, 1946.                W. RYAN                2,404,988
                            MAP DEVICE
                      Filed March 20, 1945        2 Sheets-Sheet 1

INVENTOR.
William Ryan
BY
Zoltan A. Polachek
ATTORNEY

July 30, 1946.  W. RYAN  2,404,988
MAP DEVICE
Filed March 20, 1945  2 Sheets-Sheet 2
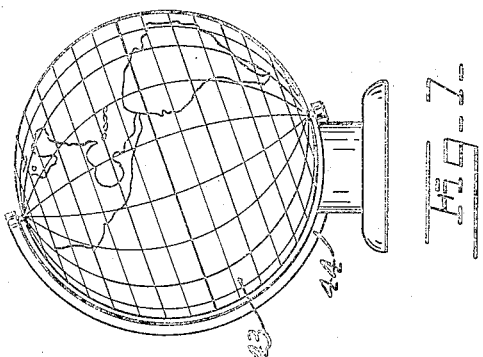
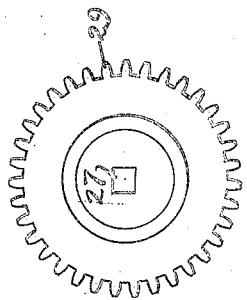
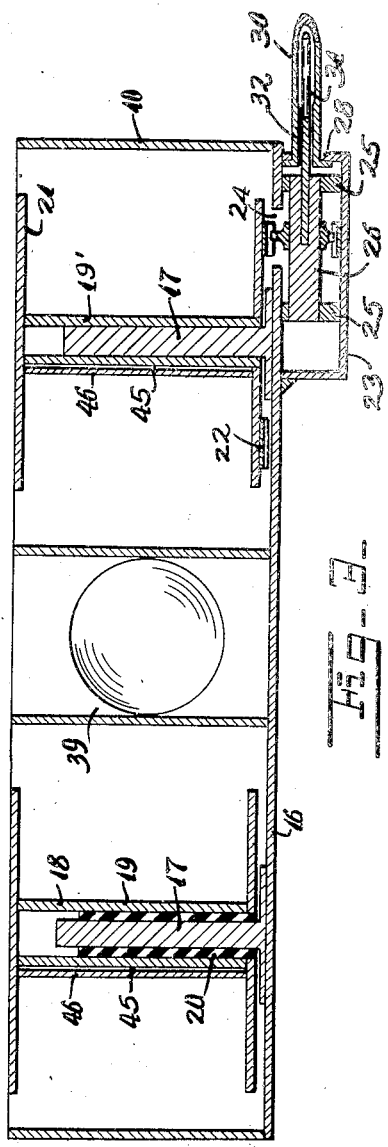
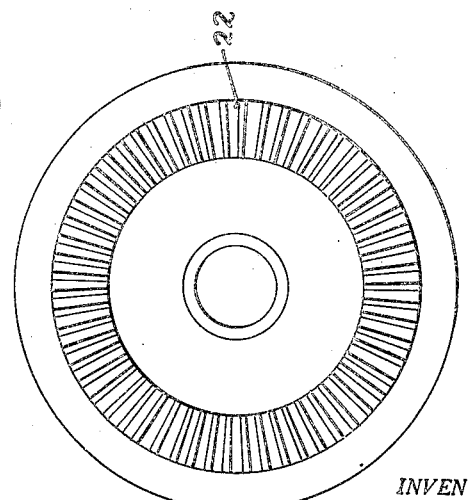
INVENTOR.
William Ryan
BY
ATTORNEY Patented July 30, 1946

2,404,988

UNITED STATES PATENT OFFICE 2,404,988

MAP DEVICE

William Ryan, New York, N. Y.

Application March 20, 1945, Serial No. 583,756

6 Claims. (Cl. 88—24)

This invention relates to new and useful improvements in map devices.

More specifically the invention proposes a device having a long transparent map adapted to be wound from one spool to another, to be projected for enlargement and to be synchronized with a moving vehicle or conveyance so that the same lineal distance is traversed on the map as is traversed by the vehicle. The vehicle may be an automobile, a ship, an airplane or any other conveyance.

Still further, it is proposed to provide a map device as aforesaid adapted to be wound from one spool to another by a flexible drive from some part of the vehicle which accurately responds to the lineal distance traversed by the vehicle.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 3 is an enlarged section on the line 3—3 of Fig. 1.

Fig. 4 is an enlarged inverted plan view of the winding spool of the device.

Fig. 6 is an enlarged end view of the drive gear.

Fig. 7 is an elevation of a globe map with a transparent map strip marked thereon for removal.

Figure 1:
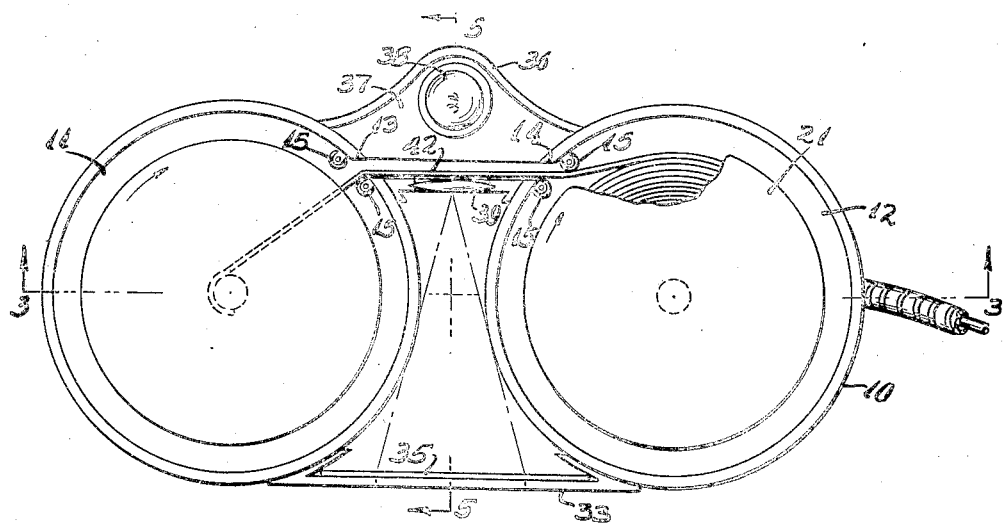
Fig. 1 is a plan view of the map device of the present invention, a flexible shaft drive being shown fragmentally.
Figure 2:
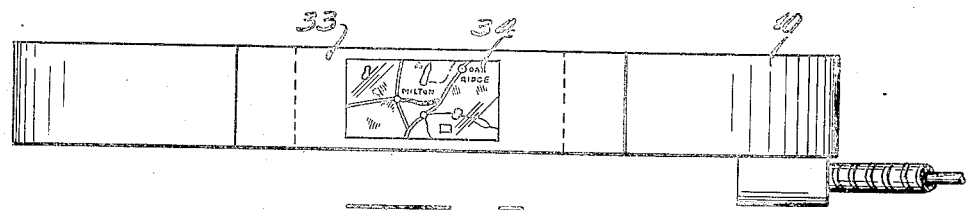
Fig. 2 is a front view of the device of Fig. 1.
Figure 5:
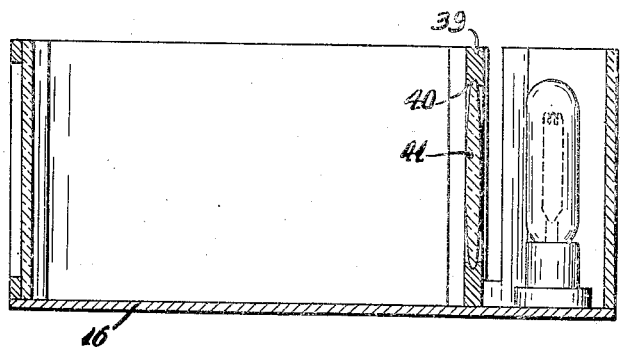
Fig. 5 is an enlarged section on the line 5—5 of Fig. 1, parts being shown in full.

The map device, according to this invention, comprises a case 10 formed of a plurality of parts of sheet metal secured together as by welding. The case includes upstanding walls providing two spaced circular chambers 11 and 12 having opposed aligned slots 13 and 14 respectively. Map guiding rollers 15 are disposed on each side of each slot. The case is open at the top and closed at the bottom by a wall 16 and slots 13 and 14 are open at the top. If desired, a cover (not shown) may be provided for the case. A spindle 17 is secured to the wall 16 and extends upwardly in the center of each chamber. A spool 18 is freely disposed on spindle 17 in chamber 11. The spool 18 has a hollow central member 19 lined with a rubber bushing 20. The rubber bushing lightly engages the adjacent spindle 17, providing friction causing the spool 18 to rotate slowly and preventing it from moving except in response to the winding mechanism later to be described.

A spool 21 is rotatably supported on spindle 17 in chamber 12. A ring gear 22 is secured to the bottom face of the spool 21. A casing 23 is secured to the bottom face of wall 16 under one edge of spool 21, and a hole 24 is formed in the bottom wall 16 in line with ring gear 22 and opening into casing 23. Spaced bearing blocks 25 are secured in the casing and a shaft 26 is journalled therein. This shaft is provided at one end with a square recess 27 in line with an opening 28 in the adjacent end wall of the casing. A spur gear 29 is supported on shaft 26 and extends through hole 24 and meshes with ring gear 22. A flexible shaft casing 30 is secured in opening 28 and a flexible shaft 31 having a square end 32 is disposed in the casing 30 with the square end 32 disposed in recess 27. Rotation of the flexible shaft rotates gear 29 and therefore ring gear 22 and spool 21.

Each of the chambers 11 and 12 is defined, as aforesaid, by a circular upstanding wall. At the front of the case a front wall 33 connects the walls of the two chambers and this wall 33 is provided with a rectangular opening 34. The ends of wall 33 are turned over and secured to the walls of the chambers 11 and 12 and a photographic screen 35 is secured therein, covering opening 34. The screen may be a sheet of ground glass or a stiff sheet of semi-transparent beaded screen, or other suitable material.

At the rear of the case the walls of chambers 11 and 12 are bridged by a curved wall 36 which encloses a chamber 37 in which is disposed a projection tube 38. Another wall 39, between walls 33 and 36, bridges the walls of chambers 11 and 12 at the front of the slots 13 and 14. This wall 39 is provided with an opening 40 in which is disposed a projection lens 41.

A long strip map 42 printed on transparent material, is wound on spool 18 and is adapted to be wound on spool 21 as it is wound off of spool 18. This map may be a flat map produced especially for use in the map device, or it may be a section cut off of a globe map such as the section 43 of the globe 44 shown in Fig. 7. The map is shown in Fig. 1 almost completely wound on the spool 21 and just about to come off of spool 18. The map may be secured to the two spools for winding and unwinding in any desired manner, such as in slots 45 provided on the spools by a strip of metal 46 secured parallel to the member 19 of spool 18 and to the member 19' of spool 21.

The map device aforedescribed is adapted for employment in various vehicles and conveyances. It may be attached to the dashboard of an automobile, and in such case the map 42 will be a road map marked with roads, towns and so forth. It may be an aerial map for an airplane and in such case would be attached to the airplane instrument board. Also it may be a sea lane map for use in an ocean going vessel. In any case the flexible shaft 31 will be driven by some operating part of the automobile, airplane or ship, as the case may be. The map in any instance will include a scale of miles and it will be wound from spool 18 onto spool 21 at a rate so that the lineal distance covered by the vehicle will be the same as the lineal distance on the map scale of miles. Therefore, a person looking at the map can see at a glance where he is, how far he has gone and how far he has still to go.

As the map may be designed to cover long distances, it is desirable to proportion it small, and therefore the projection tube, lens and screen are provided for enlarging the map sufficiently for a person to clearly see the details of the map at a glance. However, the map and the device may be made of any desired size according to the use to which it is to be put.

As an example of the action of the drive mechanism, assume the case of the map device being used with an automobile and being mounted on the dashboard thereof. The flexible shaft 31 may then be driven from the same gear that the speedometer flexible shaft of the automobile is driven from. Accordingly the gear ratio will be such that the map will be wound upon spool 21 very slowly, a small movement of the map indicating a long distance traversed. This ratio is associated in the map device itself, over and above the gear ratio between the flexible shaft and the speedometer drive gear (not shown), by the related sizes of the ring gear 22 and the spur gear 29, which ratio causes the ring gear to rotate at only a fraction of the speed of gear 29.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A map device comprising a case having a bottom wall, walls upstanding from said bottom wall and defining two spaced chambers, aligned slots in said walls of said chambers, a spindle in the center of each of said chambers, a drive spool mounted on one of said spindles, a ring gear secured to said drive spool, another spool mounted freely on the other of said spindles, a transparent map wound on said free spool and adapted to be unwound therefrom and wound on said drive spool and to pass through said slots, a projection lens between said chambers in front of the portion of said map passing through said slots, a projection screen between said chambers in front of said lens, a projection tube between said chambers to the rear of said map portion, adapted to send light through said map portion and lens and to project and enlarge said map portion on said screen, a casing secured to the bottom wall of said case, an opening in said bottom wall in line with said gear and opening into said case, a gear rotatably mounted in said casing, extending through said opening and meshing with said ring gear, and means connected to said last mentioned gear for rotating same and thereby rotating said spool gear and said drive spool.

2. A map device comprising a case having a bottom wall, walls upstanding from said bottom wall and defining two spaced chambers, aligned slots in said walls of said chambers, a spindle in the center of each of said chambers, a drive spool mounted on one of said spindles and having a ring gear secured thereto, another spool mounted freely on the other of said spindles, a transparent map wound on said free spool and adapted to be unwound therefrom and wound on said drive spool and to pass through said slots, a projection lens between said chambers in front of the portion of said map passing through said slots, a projection screen between said chambers in front of said lens, a projection tube between said chambers to the rear of said map portion, adapted to send light through said map portion and lens and to project and enlarge said map portion on said screen, a casing secured to the bottom wall of said case, an opening in said bottom wall in line with said ring gear and opening into said case, a gear rotatably mounted in said casing, extending through said opening and meshing with said ring gear, and a flexible shaft connected to said last mentioned gear for rotating same and thereby rotating said ring gear and said drive spool.

3. A map device comprising a case having a bottom wall, walls upstanding from said bottom wall and defining two spaced chambers, aligned slots in said walls of said chambers, a spindle in the center of each of said chambers, a drive spool mounted on one of said spindles and having a ring worm gear secured thereto, another spool mounted freely on the other of said spindles, a transparent map wound on said free spool and adapted to be unwound therefrom and wound on said drive spool and to pass through said slots, a projection lens between said chambers in front of the portion of said map passing through said slots, a projection screen between said chambers in front of said lens, a projection tube between said chambers to the rear of said map portion, adapted to send light through said map portion and lens and to project and enlarge said map portion on said screen, a casing secured to the bottom wall of said case, an opening in said bottom wall in line with said ring worm gear and opening into said case, a worm gear rotatably mounted in said casing, extending through said opening and meshing with said ring worm gear, and means connected to said worm for rotating same and thereby rotating said ring worm gear and said drive spool.

4. A map device comprising a case having a bottom wall, walls upstanding from said bottom wall and defining two spaced chambers, aligned slots in said walls of said chambers, a spindle in the center of each of said chambers, a drive spool mounted on one of said spindles, a ring gear secured to said drive spool, another spool mounted freely on the other of said spindles, a transparent map wound on said free spool and adapted to be unwound therefrom and wound on said drive spool and to pass through said slots, a projection lens between said chambers in front of the portion of said map passing through said slots, a projection screen between said chambers in front of said lens, a projection tube between said chambers to the rear of said map portion, adapted to send light through said map portion and lens and to project and enlarge said map portion on said screen, a casing secured to the bottom wall of said case, an opening in said bottom wall in line with said gear and opening into said case, a gear rotatably mounted in said casing, extending through said opening and meshing with said ring gear, and means connected to said last mentioned gear for rotating same and thereby rotating said spool gear and said drive spool, said map being a strip section from a globe map.

5. A map device comprising a case having a bottom wall, walls upstanding from said bottom wall and defining two spaced chambers, aligned slots in said walls of said chambers, a spindle in the center of each of said chambers, a drive spool mounted on one of said spindles and having a ring gear secured thereto, another spool mounted freely on the other of said spindles, friction means between said free spool and its said spindle, a transparent map wound on said free spool and adapted to be unwound therefrom and wound on said drive spool and to pass through said slots, a projection lens between said chambers in front of the portion of said map passing through said slots, a projection screen between said chambers in front of said lens, a projection tube between said chambers to the rear of said map portion, adapted to send light through said map portion and lens and to project and enlarge said map portion on said screen, a casing secured to the bottom wall of said case, an opening in said bottom wall in line with said ring gear and opening into said case, a spur gear rotatably mounted in said casing, extending through said opening and meshing with said ring gear, and means connected to said spur gear for rotating the same and thereby rotating said spool gear and said drive spool.

6. A map device comprising a case having a bottom wall, walls upstanding from said bottom wall and defining two spaced circular chambers, aligned slots in said walls of said chambers, map-guiding rollers adjacent said slots, a spindle in the center of each of said chambers, a drive spool mounted on one of said spindles and having a ring gear secured thereto, another spool mounted freely on the other of said spindles, a transparent map wound on said free spool and adapted to be unwound therefrom and wound on said drive spool and to pass through said slots, a projection lens between said chambers in front of the portion of said map passing through said slots, a projection screen between said chambers in front of said lens, a projection tube between said chambers to the rear of said map portion, adapted to send light through said map portion and lens and to project and enlarge said map portion on said screen, a casing secured to the bottom wall of said case, an opening in said bottom wall in line with said ring gear and opening into said case, a gear rotatably mounted in said casing, extending through said opening and meshing with said ring gear, and means connected to said last mentioned gear for rotating same and thereby rotating said ring gear and said drive spool.

WILLIAM RYAN.